United States Patent
Breese et al.

(10) Patent No.: US 6,855,060 B2
(45) Date of Patent: Feb. 15, 2005

(54) SPAN CONTROL SLEEVE FOR POSITIONING A BEARING CUP RELATIVE TO A YOKE IN A UNIVERSAL JOINT ASSEMBLY

(75) Inventors: Douglas E. Breese, Walbridge, OH (US); Matheno B. Bey, Toledo, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/351,259

(22) Filed: Jan. 24, 2003

(65) Prior Publication Data

US 2004/0147328 A1 Jul. 29, 2004

(51) Int. Cl.[7] ................................................. F16D 3/40
(52) U.S. Cl. ........................ 464/130; 464/134; 403/13; 29/898.07
(58) Field of Search ................................. 464/127, 125, 464/126, 128, 130, 132, 112, 905, 134; 403/57, 58, 74, 154, 12, 13, 14; 29/898.043, 898.07

(56) References Cited

U.S. PATENT DOCUMENTS

| | | | | |
|---|---|---|---|---|
| 2,036,978 A | * | 4/1936 | Anderson | 384/564 |
| 2,212,763 A | | 8/1940 | Wollner | |
| 2,228,715 A | * | 1/1941 | Wollner | 464/130 |
| 2,358,505 A | * | 9/1944 | Greiner | 464/129 |
| 3,200,615 A | | 8/1965 | Stokely | |
| 3,204,428 A | | 9/1965 | Stokely | |
| 3,423,958 A | * | 1/1969 | Koelling | 464/12 |
| 3,545,232 A | * | 12/1970 | Neese et al. | 464/131 |
| 3,726,577 A | * | 4/1973 | Faulbecker | 384/564 |
| 3,783,638 A | | 1/1974 | Doran et al. | |
| 4,784,629 A | | 11/1988 | Jones | |
| 5,000,609 A | | 3/1991 | Dutkiewicz et al. | |

FOREIGN PATENT DOCUMENTS

GB    2060136 A  *  4/1981  ............. F16D/3/41

OTHER PUBLICATIONS

Dana Drawing No. SPL25–5X dated Jun. 1999.
Dana Drawing No. SKU–1229935 dated Nov. 1999.

* cited by examiner

*Primary Examiner*—Kenn Thompson
(74) *Attorney, Agent, or Firm*—MacMillan, Sobanski & Todd, LLC

(57) ABSTRACT

A universal joint assembly includes a cross and an end fitting having respective rotational centers that are precisely co-axially aligned with one another to minimize rotational imbalance. The cross has a pair of outwardly extending trunnions, upon which respective bearing cups are rotatably supported. A span control sleeve is press fit about each of the bearing cups. Each of the span control sleeves includes an outwardly extending flange portion that is precisely located relative to the rotational center of the cross. The end fitting is formed having a pair of inwardly facing surfaces that are precisely located relative to the rotational center of the end fitting. When the cross is assembled with the end fitting, the outwardly extending flange portions of the span control sleeves abut the inwardly facing surfaces of the end fitting. As a result, the rotational center of the cross is precisely aligned with the rotational center of the end fitting. An installation fixture is provided for installing the span control sleeves on the bearing cups in the desired positions.

22 Claims, 8 Drawing Sheets

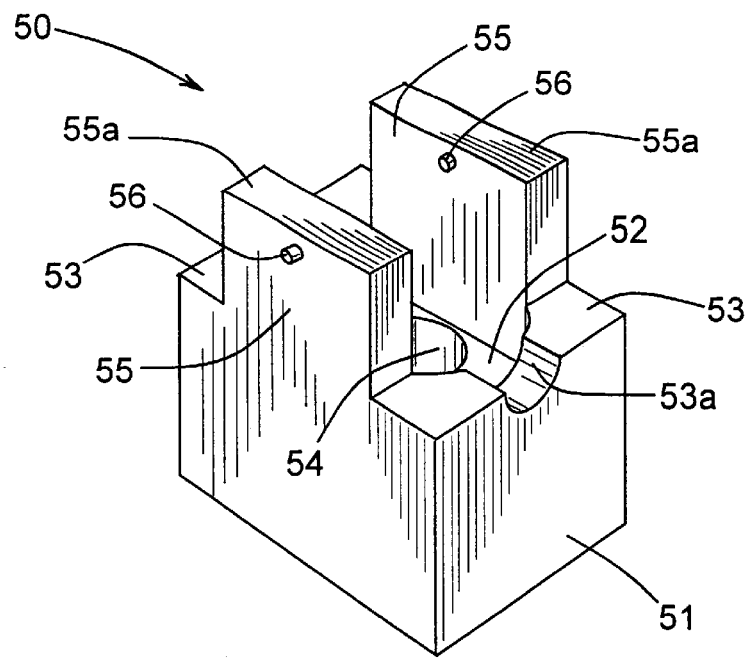
F I G. 5
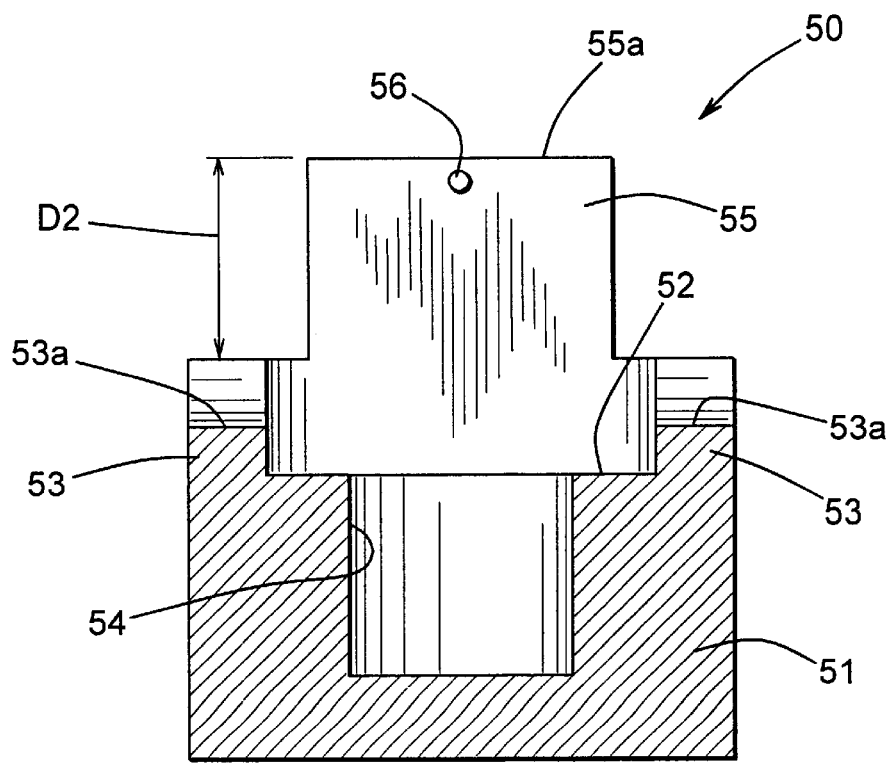
F I G. 6

SPAN CONTROL SLEEVE FOR POSITIONING A BEARING CUP RELATIVE TO A YOKE IN A UNIVERSAL JOINT ASSEMBLY

BACKGROUND OF THE INVENTION

This invention relates in general to universal joint assemblies, such as are commonly used in drive train systems for vehicles. In particular, this invention relates to an improved structure for such a universal joint assembly that facilitates the precise co-axial alignment of the rotational center of a cross with the rotational center of an end fitting to minimize rotational imbalance.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint assembly that connects the output shaft of the engine/transmission assembly to the front end of the driveshaft tube. Similarly, the rear end fitting forms a portion of a rear universal joint assembly that connects the rear end of the driveshaft tube to the input shaft of the axle assembly. The front and rear universal joint assemblies provide a rotational driving connection from the output shaft of the engine/transmission assembly through the driveshaft tube to the input shaft of the axle assembly, while accommodating a limited amount of angular misalignment between the rotational axes of these three shafts.

Each of the universal joint assemblies typically includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. In the front universal joint assembly of the above-described driveshaft assembly, the bearing cups supported on the first opposed pair of the trunnions on a front cross are connected to the front end fitting of the driveshaft assembly, while the bearing cups supported on the second opposed pair of the trunnions on the front cross are connected to an end fitting secured to the output shaft of the engine/transmission assembly. Similarly, in the rear universal joint assembly of the above-described driveshaft assembly, the bearing cups supported on the first opposed pair of the trunnions on a rear cross are connected to the rear end fitting of the driveshaft assembly, while the bearing cups supported on the second opposed pair of the trunnions on the rear cross are connected to an end fitting secured to the input shaft of the axle assembly.

In order for the driveshaft assembly to be properly balanced for rotation during use, it is important that the rotational center of the cross of the universal joint assembly be co-axially aligned with the rotational center of the end fitting to which it is connected (and, therefore, with the remainder of the driveshaft assembly) when there is no angular misalignment therebetween. Such co-axial alignment minimizes the overall amount of imbalance in the driveshaft assembly that may need to be corrected to prevent the generation of undesirable noise or vibration when the driveshaft assembly is rotated during use. In the past, the rotational center of the cross has been retained in co-axial alignment with the rotational center of the end fitting by mechanical retainers that were secured to the end fitting and abutted the bearing cups supported on the cross. A variety of such mechanical retainers are known in the art. In one known structure, the mechanical retainers are embodied as snap rings that are disposed in grooves machined in the inner surfaces of a pair of aligned openings formed through respective arms of the end fitting. The snap rings engage end surfaces provided on the bearing cups to retain them and the cross in position relative to the end fitting. In another known structure, the mechanical retainers are embodied as clips that are secured to the opposed outer surfaces of the arms of the end fittings. The spring clips also engage the end surfaces of the bearing cups to retain them and the cross in position relative to the end fitting.

Although these known mechanical retainers have been effective, it has been found that the stack-up of manufacturing tolerances of the various components can result in imprecise positioning of the rotational centers of the cross and the end fitting. As a result, it has been found that the overall amount of imbalance in the driveshaft assembly that may need to be corrected to prevent the generation of undesirable noise or vibration when the driveshaft assembly is rotated during use can be undesirable large. Accordingly, it would be desirable to provide an improved structure for a universal joint assembly that facilitates the precise co-axial alignment of the rotational centers of the cross and the end fitting.

SUMMARY OF THE INVENTION

This invention relates to an improved structure for a universal joint assembly that facilitates the precise co-axial alignment of the rotational center of a cross with the rotational center of an end fitting to minimize rotational imbalance. The cross has a pair of outwardly extending trunnions, upon which respective bearing cups are rotatably supported. A span control sleeve is press fit about each of the bearing cups. Each of the span control sleeves includes an outwardly extending flange portion that is precisely located relative to the rotational center of the cross. The end fitting is formed having a pair of inwardly facing surfaces that are precisely located relative to the rotational center of the end fitting. When the cross is assembled with the end fitting, the outwardly extending flange portions of the span control sleeves abut the inwardly facing surfaces of the end fitting. As a result, the rotational center of the cross is precisely aligned with the rotational center of the end fitting. An installation fixture is provided for installing the span control sleeves on the bearing cups in the desired positions.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a perspective view of a fixture for assembling and positioning the span control sleeve on the bearing cup as shown in FIG. 2.

FIG. 6 is an enlarged sectional elevational view of the installation fixture illustrated in FIG. 5.

DETAILED DESCRIPTION OF THE PREFERRED EMBODIMENT

Figure 1:
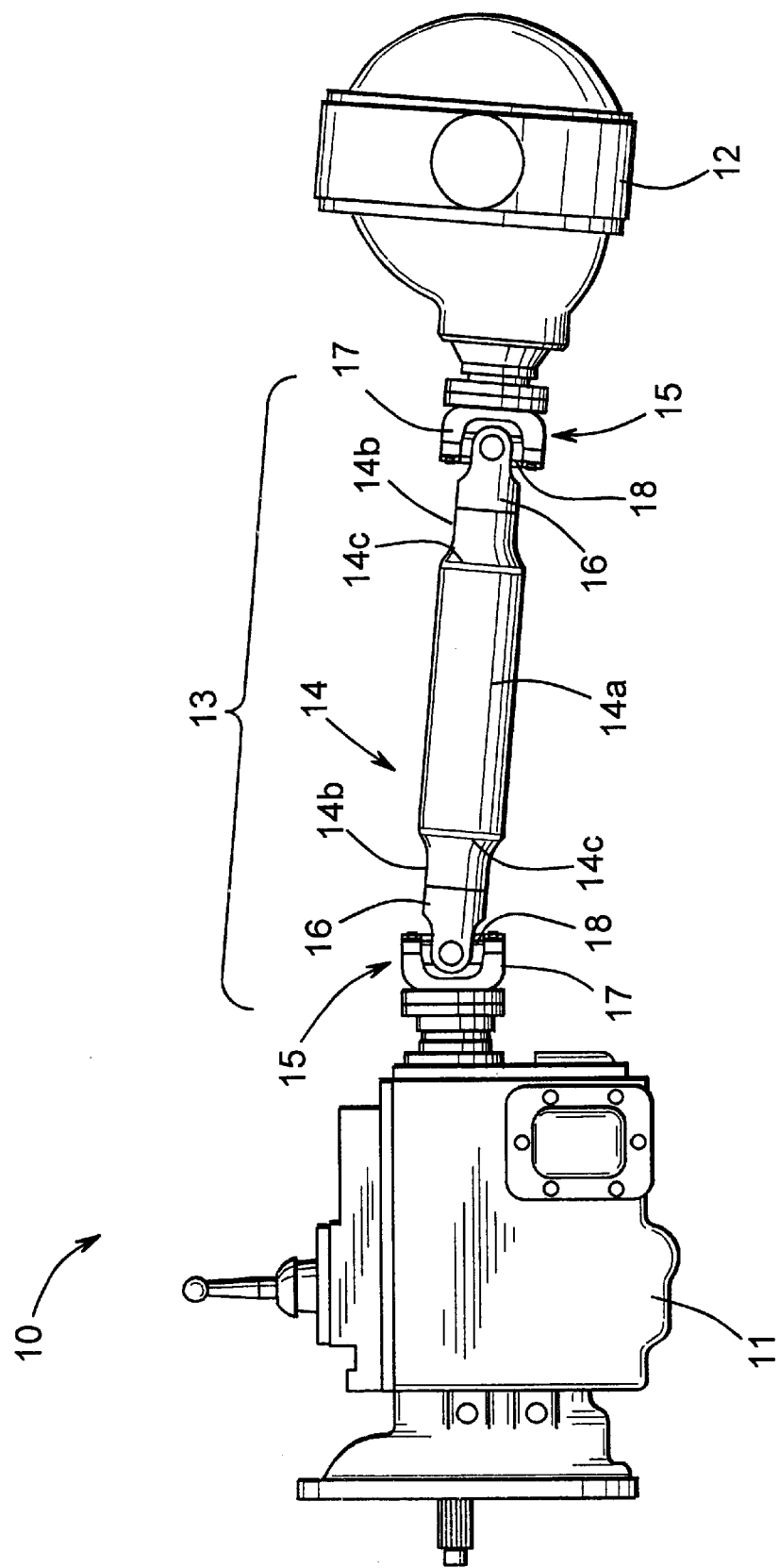
FIG. 1 is a side elevational view schematically illustrating a vehicle drive train system including a pair of universal joint assemblies in accordance with this invention.

Referring now to the drawings, there is illustrated in FIG. 1 a vehicle drive train system, indicated generally at 10, in accordance with this invention. The illustrated vehicle drive train system 10 is, in large measure, conventional in the art and is intended merely to illustrate one environment in which this invention may be used. Thus, the scope of this invention is not intended to be limited for use with the specific structure for the vehicle drive train system 10 illustrated in FIG. 1 or with vehicle drive train systems in general. On the contrary, as will become apparent below, this invention may be used in any desired environment for the purposes described below.

The illustrated vehicle drive train system 10 includes a transmission 11 having an output shaft (not shown) that is connected to an input shaft (not shown) of an axle assembly 12 through a driveshaft assembly 13. The transmission 11 is rotatably driven by an engine (not shown) or other source of rotational power in a conventional manner. The driveshaft assembly 13 includes a cylindrical driveshaft tube, indicated generally at 14, having a center portion 14a and a pair of opposed end portions 14b. In the illustrated embodiment, the center portion 14a of the driveshaft tube 14 is formed having a larger outer diameter than either of the end portions 14b. Thus, respective transition regions 14c are defined between the larger diameter center portion 14a of the illustrated driveshaft tube 14 and each of the smaller diameter end portions 14b thereof. However, the driveshaft tube 14 may be formed having a constant diameter throughout the length thereof or any other desired shape. Alternatively, the illustrated single driveshaft tube 14 may be replaced by a compound driveshaft assembly (not shown) having separate first and second driveshaft sections that are supported by a center bearing assembly between the transmission 11 and the axle assembly 12.

The output shaft of the transmission 11 and the input shaft of the axle assembly 12 are typically not co-axially aligned during operation of the drive train system 10. To accommodate this, a pair of universal joint assemblies, each indicated generally at 15, are provided at the end portions of the driveshaft 14 to connect such end portions 14b respectively to the output shaft of the transmission 11 and to the input shaft of the axle assembly 12. The first universal joint assembly 15 includes a full round tube yoke 16 that is secured to the forward end portion 14b of the driveshaft tube 14 by any conventional means, such as by welding or adhesives. The first universal joint assembly 15 further includes a half round end yoke 17 that is connected to the output shaft of the transmission 11. A first cross 18 is provided for connecting the full round tube yoke 16 to the half round end yoke 17. Similarly, the second universal joint assembly 15 includes a full round tube yoke 16 that is secured to the rearward end portion 14b of the driveshaft tube 14 by any conventional means, such as by welding or adhesives. The second universal joint assembly 15 further includes a half round end yoke 17 that is connected to the input shaft of the axle assembly 12, and a second cross 18 is provided for connecting the full round tube yoke 16 to the half round end yoke 17.

Figure 2:
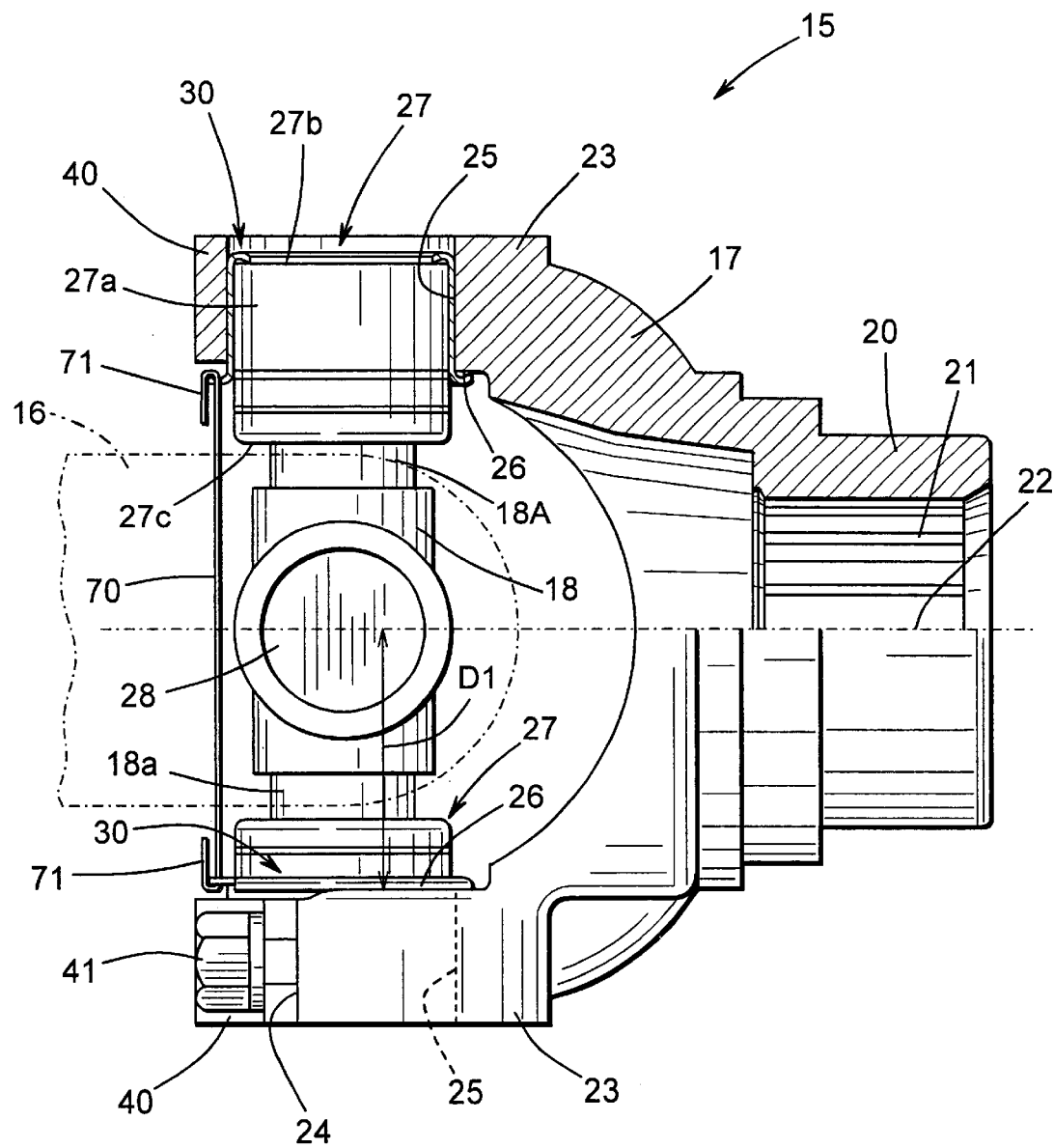
FIG. 2 is a side elevational view, partially in cross section, of one of the universal joint assemblies illustrated in FIG. 1 including a pair of bearing cups having respective span control sleeves installed thereon for precisely positioning the bearing cups relative to a half round end yoke.

The structure of a portion of the second universal joint assembly 15 is more clearly illustrated in FIG. 2. As shown therein, the half round end yoke 17 includes a generally hollow cylindrical body portion 20 that defines an inner circumferential surface having a plurality of internal splines 21 formed therein. Thus, the hollow cylindrical body portion 20 of the half round end yoke 17 is adapted to be secured to a male splined shaft, such as the input shaft of the axle assembly 12. The hollow cylindrical body portion 20 defines an axis of rotation 22 for the half round end yoke 17. First and second opposed arm portions 23 extend generally axially from the hollow cylindrical body portion 20. Each of the opposed arm portions 23 terminates in a flat end surface 24 (only one is illustrated) having a generally semi-cylindrical recess 25 and a pair of threaded bores (not shown) formed therein. Additionally, at least one (and preferably each) of the opposed arm portions 23 has a surface 26 machined or otherwise formed thereon that faces inwardly toward the axis of rotation 22. The inwardly facing surfaces 26 of the opposed arm portions 23 are each located a precise distance (identified by the arrow D1 in FIG. 2) from the axis of rotation 22 of the half round end yoke 17. The purposes for the semi-circular recesses 25, the threaded bores, and the inwardly facing surfaces 26 will be explained below.

The cross 18 of the universal joint assembly 15 includes a central body portion having a first pair of generally cylindrical trunnions 18a and a second pair of generally cylindrical trunnions 18b (see FIGS. 7 through 10) extending outwardly therefrom. The trunnions 18a and 18b are oriented in a single plane and extend at right angles relative to one another. The trunnions 18a are preferably co-axially aligned with one another along a center axis that passes through the rotational center of the cross 18. The outer surfaces of the trunnions 18a are approximately equal in size and define a radius from such center axis. A hollow cylindrical bearing cup, indicated generally at 27, is mounted on the end of each of the trunnions 18a. Each of the bearing cups 27 includes a hollow cylindrical wall portion 27a that extends from a closed end 27b to an opened end 27c. Bearing structures (such as respective pluralities of needle bearings, for example) are preferably provided between the outer cylindrical surfaces of the trunnions 18a and the inner cylindrical surfaces of the associated bearing cups 27 to facilitate rotational movements of the bearing cups 27 relative to the trunnions 18a. The bearing cups 18a are adapted to be secured to the half round end yoke 17 in the manner described below to form a first portion of the universal joint assembly 15.

Similarly, the trunnions 18b are also preferably co-axially aligned with one another along a center axis that passes through the rotational center of the cross 18. The outer surfaces of the trunnions 18b are approximately equal in size and define a radius from such center axis. A hollow cylindrical bearing cup, indicated generally at 28 (only one is illustrated), is mounted on the end of each of the trunnions 18b. Each of the bearing cups 28 includes a hollow cylindrical wall portion that extends from a closed end to an opened end. Bearing structures (such as respective pluralities of needle bearings, for example) are preferably provided between the outer cylindrical surfaces of the trunnions 18b and the inner cylindrical surfaces of the associated bearing cups 28 to facilitate rotational movements of the bearing cups 28 relative to the trunnions 18b. The bearing cups 18b are adapted to be secured to the tube yoke 16 secured to the end portion 14b of the driveshaft tube 14 in a conventional manner to form a second portion of the universal joint assembly 15.

Figure 3:
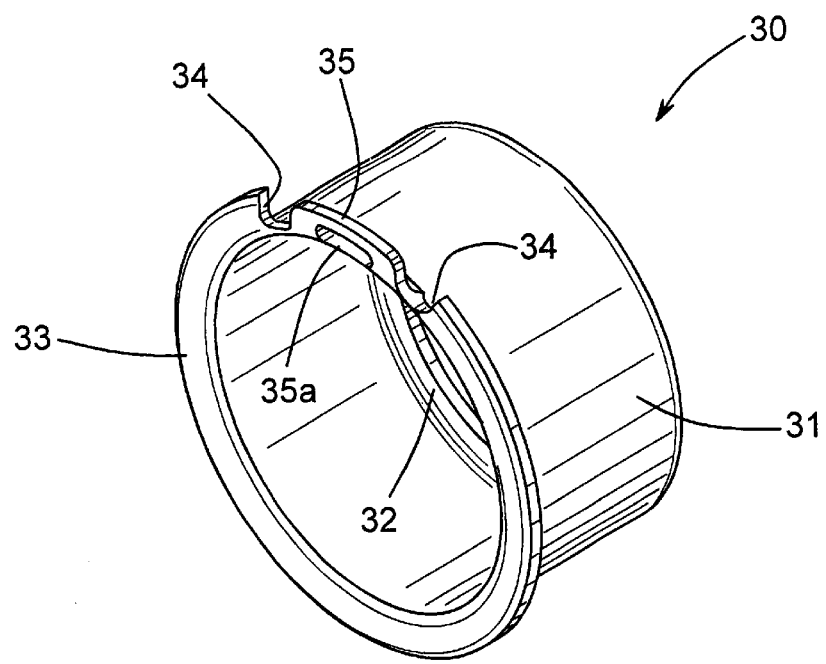
FIG. 3 is an enlarged perspective view of one of the span control sleeves illustrated in FIG. 2.
Figure 4:
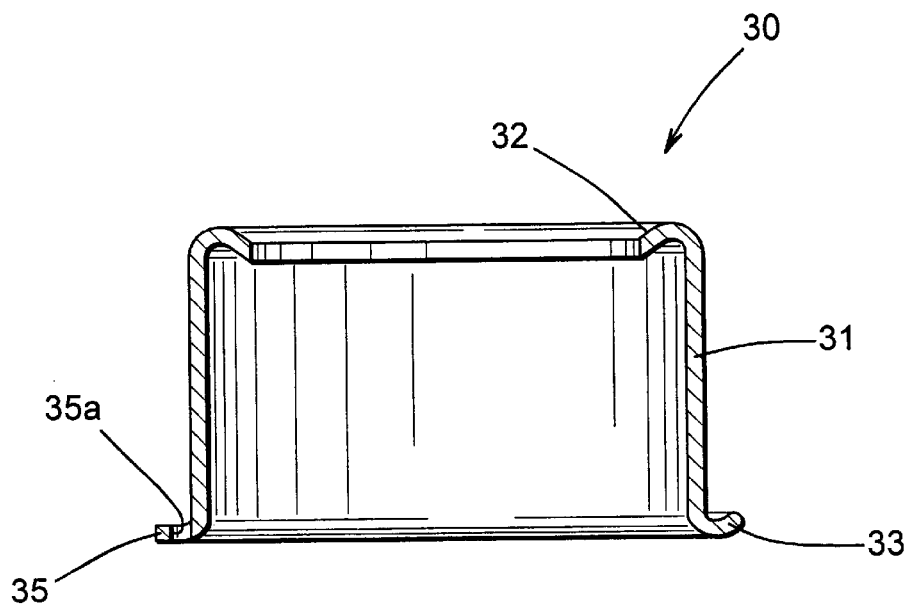
FIG. 4 is a sectional elevational view of the span control sleeve illustrated in FIG. 3.

A span control sleeve, indicated generally at 30, is provided about each of the bearing cups 27 supported on the trunnions 18a. The structure of one of the span control sleeves 30 is illustrated in detail in FIGS. 3 and 4. As shown therein, the span control sleeve 30 includes a hollow, cylindrical wall portion 31 that extends between a first end having an inwardly extending flange portion 32 formed thereon and a second end having an outwardly extending flange portion 33 formed thereon. The inwardly extending flange portion 32 is preferably formed having a generally C-shaped configuration that extends not only radially inwardly from the wall portion 31, but also extends axially within a portion of such wall portion 31. The outwardly extending flange portion 33 is also preferably formed having a generally C-shaped configuration that extends not only radially outwardly from the wall portion 31, but also extends axially about a portion of such wall portion 31. As shown in FIG. 3, the outwardly extending flange portion 33 has a pair of notches 34 formed therethrough that define a tab 35. The tab 35 may have an opening 35a formed therethrough. The purposes for the inwardly extending flange portion 32, the outwardly extending flange portion 33, the tab 35, and the opening 35a will be explained below.

In a manner that is described in detail below, each of the span control sleeves 30 is installed on an associated one of the bearing cups 27 in a predetermined position relative thereto. When so installed, the wall portions 31 of the span control sleeves 30 are disposed about the wall portions 27a of the bearing cups 27 such that the inwardly extending flange portions 32 of the span control sleeves 30 abut the closed end portions 27b of the bearing cups 27. The generally C-shaped configurations of the inwardly extending flange portions 32 of the span control sleeves 30 provide a measure of resiliency in their abutment the closed end portions 27b of the bearing cups 27. For reasons that will become apparent below, the wall portions 31 of the span control sleeves 30 are preferably sized to engage the wall portions 27b of the bearing cups 27 in a press fit relationship so as to resist relative movement therebetween under normal circumstances.

After the span control sleeves 30 are installed on the respective bearing cups 27, the cross 18 carrying the bearing cups 27 and the span control sleeves 30 can be installed on the half round end yoke 17, as shown in FIG. 2. To accomplish this, the bearing cups 27 and the span control sleeves 30 are inserted within the semi-cylindrical recesses 25 formed in the opposed arm portions 23 of the half round end yoke 17. At the same time, the outwardly extending flange portions 33 of the span control sleeves 30 abut the inwardly facing surfaces 26 formed on the opposed arm portions 23 of the half round end yoke 17. Consequently, the span control sleeves 30 (and, therefore, the bearing cups 27 and the cross 18) are positively positioned relative to the half round end yoke 17. As will be explained in detail below, the span control sleeves 30 are preferably positioned on the bearing cups 27 such that when the cross 18 is installed on the half round end yoke 17 as described above, the rotational center of the cross 18 is precisely co-axially aligned with the axis of rotation 22 of the half round end yoke 17.

Once the cross 18 has been installed on the half round end yoke 17, it can be positively retained thereon for normal use in the vehicle drive train system 10. To accomplish this, a pair of retainer straps 40 can be secured to the flat end surfaces 24 of the opposed arm portions 23 by means of respective pairs of threaded fasteners 41 (only one is illustrated) that extend into threaded engagement with the threaded bores formed therein. The retainer straps 40 extend about the bearing cups 27 and the span control sleeves 30 to positively retain them to the opposed arm portions 23 of the half round end yoke 17. As a result, the cross 18 is securely connected to the half round end yoke 17 for normal use in the vehicle drive train system 10. The retainer straps 40 securely retain the cross 18 in the above-described installed position, wherein the rotational center of the cross 18 is precisely co-axially aligned with the axis of rotation 22 of the half round end yoke 17. Thus, the universal joint 15 provides a rotational driving connection from the driveshaft tube 14 to the input shaft of the axle assembly 12, while accommodating a limited amount of angular misalignment between the rotational axes of these two shafts.

Referring now to FIGS. 5 and 6, there is illustrated a fixture, indicated generally at 50, for installing the span control sleeve 30 on the bearing cup 27 in a predetermined position relative thereto, such as shown in FIG. 2. The installation fixture 50 includes a base 51 having a generally rectangular recessed area 52 formed in an upper central portion thereof. The recessed area 52 defines a pair of opposed end walls 53 that have respective semi-cylindrical recesses 53a formed therein. The semi-cylindrical recesses 53a are preferably co-axially aligned with one another along a center axis. The semi-cylindrical recesses 53a are approximately equal in size and define a radius from such center axis. For reasons that will be explained below, the radii defined by two semi-cylindrical recesses 53a are preferably equal to the radii defined by the trunnions 18b of the cross 18 of the universal joint assembly 15.

The installation fixture 50 also includes a relatively large cylindrical counterbore 54 that is formed is formed in the base 51 thereof, extending downwardly within the base 51 from the bottom of the recessed area 52. The installation fixture 50 further includes a pair of opposed side walls 55 that extend upwardly from the base 51 and terminate in respective upper surfaces 55a. The upper surfaces 55a of the opposed side walls 55 are preferably co-planar with one another and are each located a precise distance (identified by the arrow D2 in FIG. 6) from the center axis defined by the semi-cylindrical recesses 53a formed in the opposed end walls 53 of the installation fixture 50. Lastly, the installation fixture 50 includes first and second locating pins 56 that are press fit within respective apertures formed through upstanding side walls 55 and extend inwardly toward one another. The purposes for the counterbore 54 and the locating pins 56 will be explained below.

The process of installing the span control sleeve 30 on a bearing cup 27 is illustrated in detail in FIGS. 7 through 10.

Figure 7:
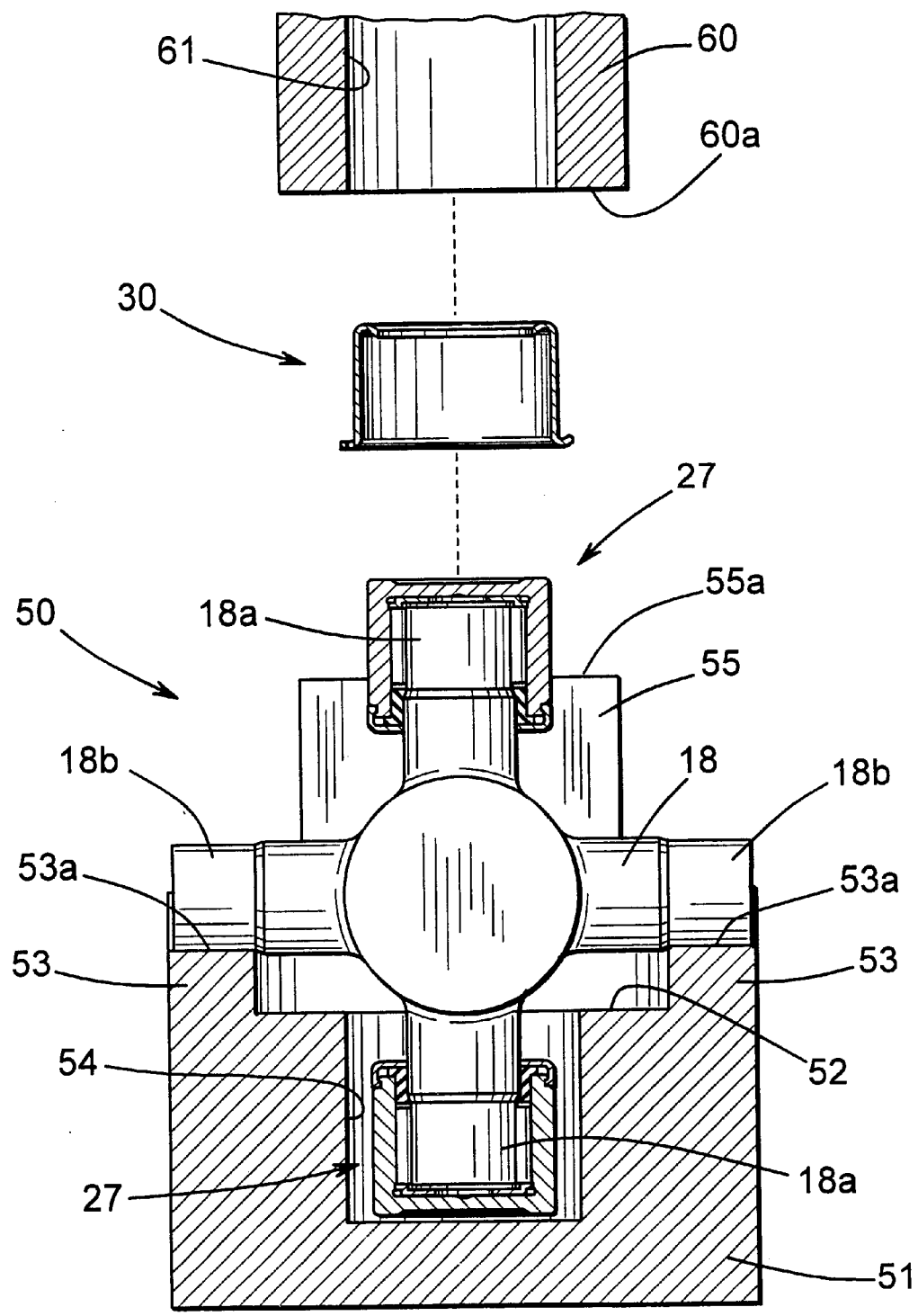
FIG. 7 is an exploded sectional elevational view of the installation fixture illustrated in FIGS. 5 and 6 after the cross of the universal joint assembly has been installed thereon, but before the span control sleeve has been installed on the cross by a ram of an installation press.
Figure 8:
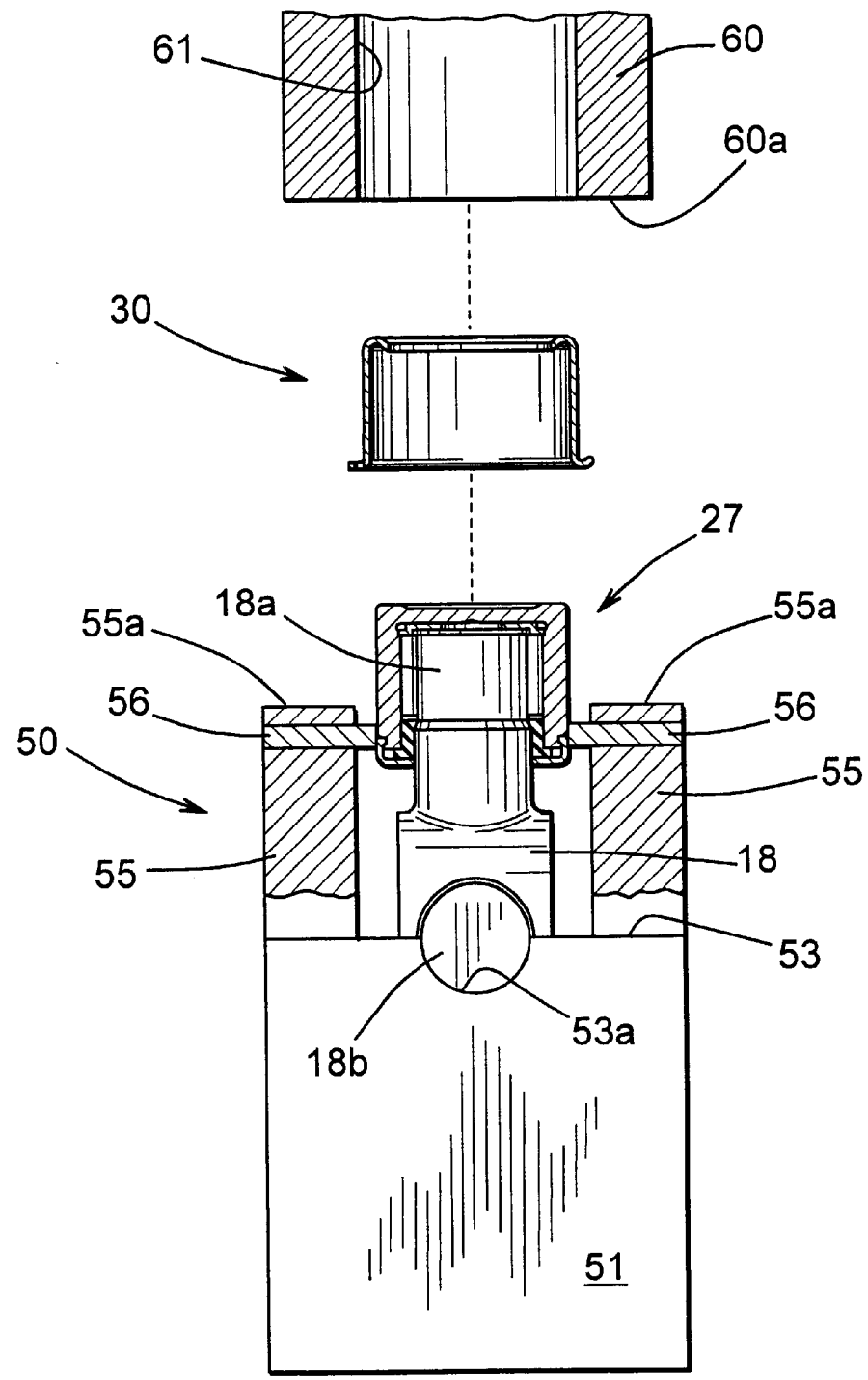
FIG. 8 is an end elevational view, partially in cross section, of the installation fixture and the cross of the universal joint assembly shown in FIG. 7.

Initially, the bearing cups 27 are installed on the first pair of trunnions 18a, but the bearing cups 28 are not installed on the second pair of trunnions 18b. Then, the cross 18 is installed on the installation fixture 50 as shown in FIGS. 7 and 8. To accomplish this, the cross 18 is disposed within the installation fixture 50 such that the trunnions 118b are respectively received within and supported on the semi-cylindrical recesses 53a formed in the opposed end walls 53. As mentioned above, the radii defined by two semi-cylindrical recesses 53a are preferably equal to the radii defined by the trunnions 18b of the cross 18 of the universal joint assembly 15. Thus, when the trunnions 18b of the cross 18 are supported on the semi-cylindrical recesses 53a, the cross 18 is precisely located relative to the installation fixture 50. As mentioned above, the upper surfaces 55a of the opposed side walls 55 of the installation fixture 50 are each located a precise distance (identified by the arrow D2 in FIG. 6) from the center axis defined by the semi-cylindrical recesses 53a formed in the opposed end walls 53 of the installation fixture 50. Consequently, when the cross 18 is installed on the installation fixture 50, the rotational center of the cross 18 is precisely located relative to the upper surfaces 55a of the upstanding side walls 55 thereof.

As the cross 18 is installed on the installation fixture 50 in this manner, the lower one of the other trunnions 18a and its associated bearing cup 27 are received within the counterbore 54 formed in the base 51 of the installation fixture 50, preferably with substantial clearance. The upper one of the other trunnions 18a and its associated bearing cup 27 extend upwardly between the upstanding side walls 55 of the installation fixture 50, also preferably with substantial clearance therebetween. However, as mentioned above, the locating pins 56 extend inwardly from the upstanding side walls 55 of the installation fixture 50 and engage portions of the outer circumferential surface of the bearing cup 27. As a result, the bearing cup 27 and the cross 18 are prevented from pivoting relative to the installation fixture 50 and, thus, are maintained in a substantially vertical orientation relative thereto. Thus, the cross 18 is precisely located relative to the installation fixture 50.

Once the cross 18 is supported on the installation fixture 50 in this manner, the span control sleeve 30 is axially aligned with the bearing cup 27, as shown in FIGS. 7 and 8. Then, a ram 60 of a conventional installation press (not shown) is co-axially aligned with the span control sleeve 30 and the bearing cup 27, as also shown in FIGS. 7 and 8. Preferably, the ram 60 includes a bottom surface 60a having an internal bore 61 formed therein. The internal bore 61 defines an inner diameter that is preferably slightly larger than an outer diameter defined by the hollow, cylindrical wall portion 31 of the span control sleeve 30, but also that is slightly smaller than an outer diameter defined by the outwardly extending flange portion 33 of the span control sleeve 30. Thus, when the ram 60 is moved downwardly toward the installation fixture 50, most of the span control sleeve 30 is received within the internal bore 61. However, the bottom surface 60a of the ram 60 engages the outwardly extending flange portion 33 of the span control sleeve 30, moving it and the remainder of the span control sleeve 30 axially downwardly with the ram 60 toward the bearing cup 27.

Figure 9:
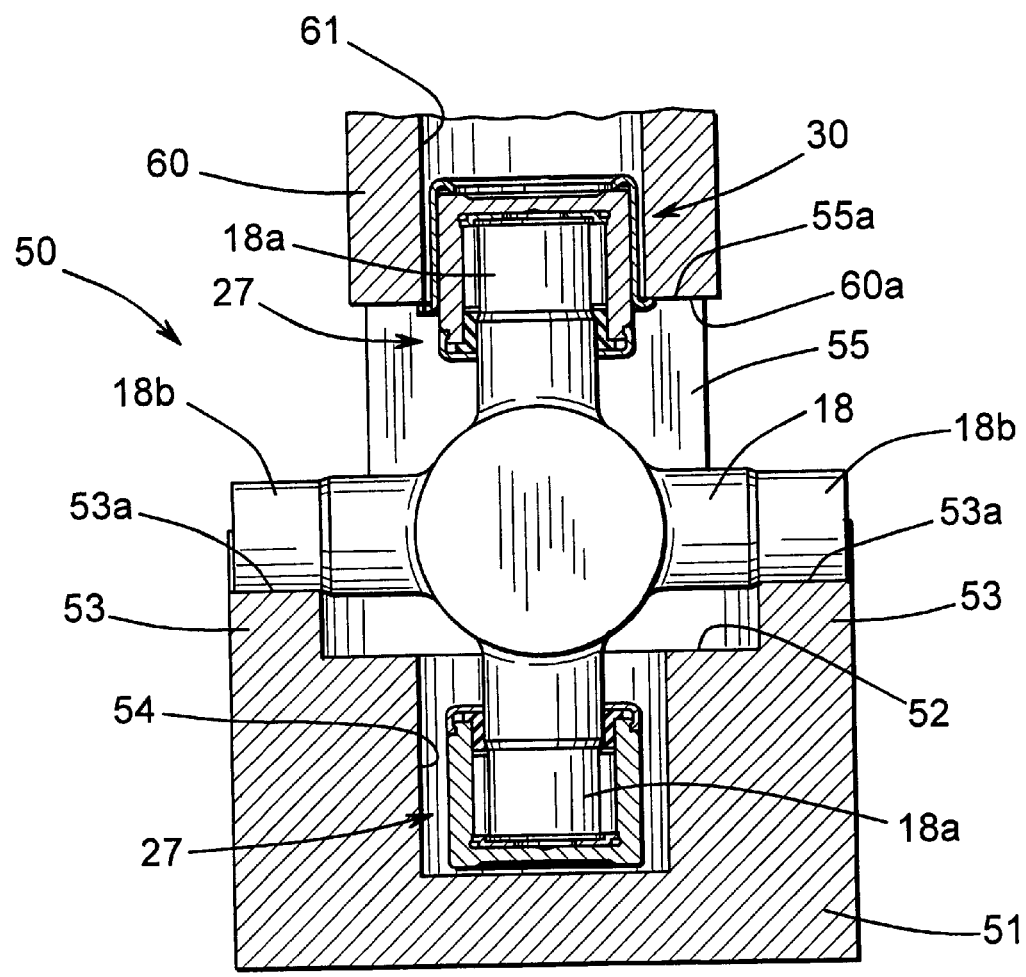
FIG. 9 is sectional elevational view similar to FIG. 7 showing the span control sleeve after it has been installed on the cross of the universal joint assembly by a ram of an installation press.
Figure 10:
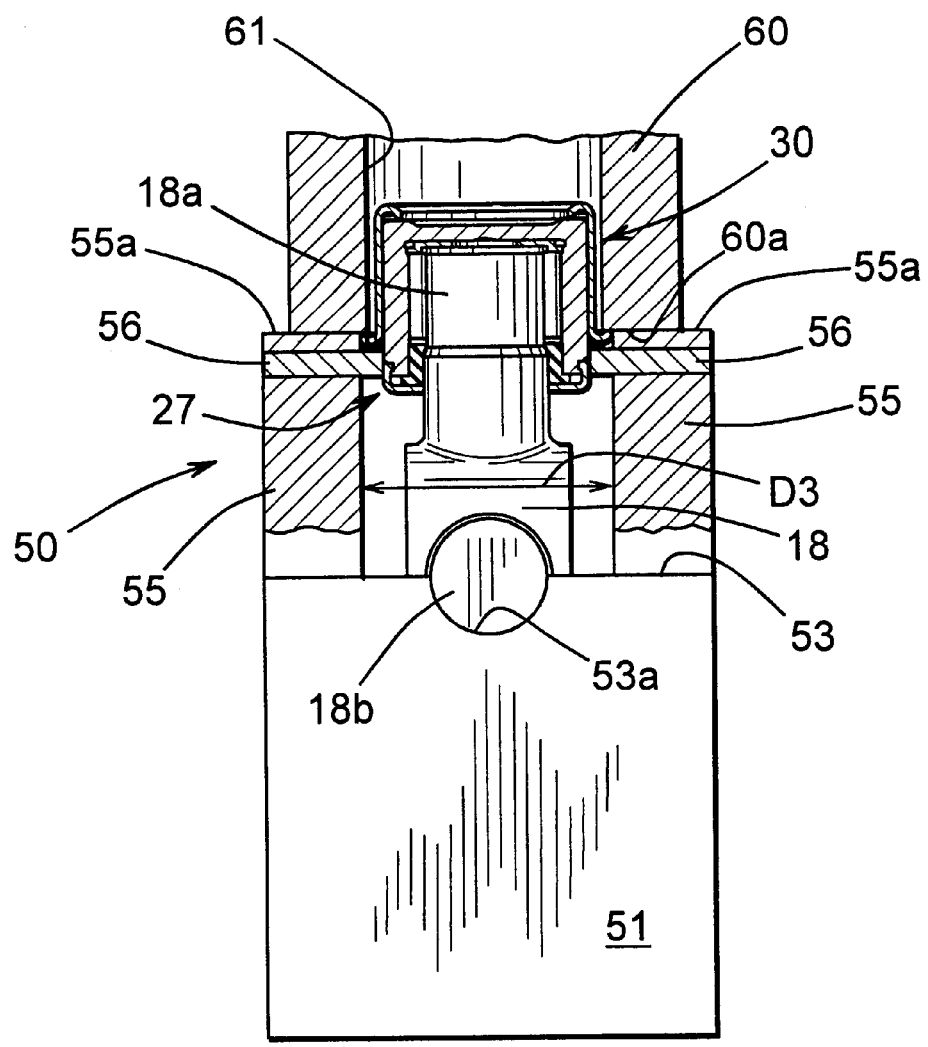
FIG. 10 is an end elevational view, partially in cross section, of the installation fixture and the cross of the universal joint assembly shown in FIG. 9.

Further downward movement of ram 60 causes the span control sleeve 30 to be moved axially downwardly about the hollow cylindrical wall portion 27a of the bearing cup 27 that is mounted on the trunnion 18a. Such downward movement continues until the bottom surface 60a of the ram 60 engages the upper surfaces 55a of the upstanding side walls 55 of the installation fixture 50, as shown in FIGS. 9 and 10. As previously discussed, the upper surfaces 55a of the opposed side walls 55 of the installation fixture 50 are each located a precise distance (identified by the arrow D2 in FIG. 6) from the center axis defined by the semi-cylindrical recesses 53a formed in the opposed end walls 53 of the installation fixture 50. Consequently, when the bottom surface 60a of the ram 60 engages the upper surfaces 55a of the upstanding side walls 55 of the installation fixture 50, the outwardly extending flange portion 33 of the span control sleeve 30 is precisely located on the bearing cup 27 relative to the rotational center of the cross 18. As also discussed above, the hollow cylindrical wall portion 31 of the span control sleeve 30 engages the hollow cylindrical wall portion 27b of the bearing cup 27 in a press fit relationship. Thus, when the bottom surface 60a of the ram 60 engages the upper surfaces 55a of the upstanding side walls 55 of the installation fixture 50, the span control sleeve 30 is fixed in the desired precise location relative to the bearing cup 27 and the rotational center of the cross 18. Thereafter, the ram 60 is retracted upwardly, allowing the cross 18 to be removed from the installation fixture 50. The cross 18 can be re-installed on the installation fixture 50 to install the other span control 30 on the other bearing cup 18a in a similar manner, again to achieve a precise location on the bearing cup 27 relative to the rotational center of the cross 18.

As best shown in FIG. 10, the outer diameter defined by the outwardly extending flange portion 33 of the span control sleeve 30 is smaller than the lateral distance (identified by the arrow D3 in FIG. 10) that exists between the two upstanding side walls 55 of the installation fixture 50. Thus, when the ram 60 moves the span control sleeve 30 downwardly as described above, the outwardly extending flange portion 33 is received between the upstanding side walls 55 of the installation fixture 50, and the downward movement of ram 60 continues until the bottom surface 60a of the ram 60 engages the upper surfaces 55a of such upstanding side walls 55. However, if desired, the outer diameter defined by the outwardly extending flange portion 33 of the span control sleeve 30 may be larger than this lateral distance D3 between the two upstanding side walls 55 of the installation fixture 50. When this is the case, the downward movement of ram 60 will continue until the outwardly extending flange portion 33 of the span control sleeve 30 is engaged between the bottom surface 60a of the ram 60 and the upper surfaces 55a of the upstanding side walls 55. In this embodiment, the outwardly extending flange portion 33 of the span control sleeve 30 is still precisely located on the bearing cup 27 relative to the rotational center of the cross 18.

Frequently, the driveshaft assembly 13 (including the driveshaft tube 14, the front and rear tube yokes 16, and the crosses 18 for the front and rear universal joint assemblies 15) is assembled at a first manufacturing location, then shipped as a unit to a second manufacturing location for assembly with the other components of the vehicle drive train system. In such an assembly process, the bearing cups 28 that are supported on the second pair of trunnions 18b are connected to the associated tube yokes 16 of the driveshaft assembly 13 at the first manufacturing location and, therefore, are positively secured thereto. However, the bearing cups 27 (including the span control sleeves 30) that are supported on the first pair of trunnions 18a are not positively retained thereon. As a result, these non-retained bearing cups 27 can move apart from one another and, in some instances, fall off of the crosses 18 until they are installed on the half round end yokes 17 at the second manufacturing location, as described above. To prevent this from occurring, the span control sleeves 30 (and their associated bearing cups 27) can be positively retained on the cross 18 by a retainer strap 70, such as shown in FIG. 2. The retainer strap 70 includes a pair of end portions 71 that extend respectively through the openings 35a formed through the tabs 35 of the outwardly extending flange portions 33 of the span control sleeves 30.

The retainer strap 70 can be removed prior to assembly with the other components of the vehicle drive train system 10 at the second manufacturing location or left in place, as desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A end fitting and cross assembly for a universal joint assembly comprising:

an end fitting including a body portion having a pair of arm portions extending therefrom, said body portion defining an axis of rotation for said end fitting, one of said arm portions having a surface provided thereon that is located a predetermined distance from said axis of rotation of said end fitting; and a cross defining an axis of rotation and including a pair of trunnions, a pair of bearing cups respectively supported on said trunnions, and a span control sleeve supported on one of said bearing cups, said span control sleeve including a portion that is located a precise distance from said axis of rotation of said cross, said portion of said span control sleeve engaging said surface on said arm portion to align said axis of rotation of said cross with said axis of rotation of said end fitting, wherein said span control sleeve includes an outwardly extending flange portion having a pair of notches formed therethrough that define a tab.

2. The end fitting and cross assembly defined in claim 1 wherein each of said arm portions has a surface provided thereon that is located a predetermined distance from said axis of rotation of said end fitting, a span control sleeve is supported on each of said bearing cups, each of said span control sleeves includes a portion that is located a precise distance from said axis of rotation of said cross, and said portions of said span control sleeves engage said surfaces on said arm portions to align said axis of rotation of said cross with said axis of rotation of said end fitting.

3. The end fitting and cross assembly defined in claim 1 wherein said outwardly extending flange portion is located a precise distance from said axis of rotation of said cross, and wherein said outwardly extending flange portion of said span control sleeve engages said surface on said arm portion to align said axis of rotation of said cross with said axis of rotation of said end fitting.

4. The end fitting and cross assembly defined in claim 1 wherein said outwardly extending flange portion has a generally C-shaped configuration.

5. The end fitting and cross assembly defined in claim 1 wherein said tab has an opening formed therethrough.

6. The end fitting and cross assembly defined in claim 1 wherein a span control sleeve is supported on each of said bearing cups, each of said span control sleeves includes an outwardly extending flange portion, and a retainer strap extends between said span control sleeves.

7. The end fitting and cross assembly defined in claim 6 wherein each of said outwardly extending flange portions has a generally C-shaped configuration.

8. The end fitting and cross assembly defined in claim 6 wherein each of said outwardly extending flange portions has a pair of notches formed therethrough that define a tab.

9. The end fitting and cross assembly defined in claim 8 wherein each of said tabs has an opening formed therethrough, and wherein said retainer strap extends through said openings.

10. The end fitting and cross assembly defined in claim 1 wherein said span control sleeve includes an inwardly extending flange portion that engages a closed end portion of said bearing cup.

11. An end fitting and cross assembly for a universal joint assembly comprising:

an end fitting including a body portion having a pair of arm portions extending therefrom, said body portion defining an axis of rotation for said end fining, one of said arm portions having a surface provided thereon that is located at a precise position relative to said axis of rotation of said end fitting; and a cross defining an axis of rotation and including a pair of trunnions, a pair of bearing cups respectively supported on said trunnions, and a span control sleeve supported on one of said bearing cups, said span control sleeve including a portion that is located a precise distance from said axis of rotation of said cross, said portion of said span control sleeve engaging said surface on said arm portion to align said axis of rotation of said cross with said axis of rotation of said end fitting.

12. The end fitting and cross assembly defined in claim 11 wherein each of said arm portions has a surface provided thereon that is located at a precise position relative to said axis of rotation of said end fitting, a span control sleeve is supported on each of said bearing cups, each of said span control sleeves includes a portion that is located a precise distance from said axis of rotation of said cross, and said portions of said span control sleeves engage said surfaces on said arm portions to align said axis of rotation of said cross with said axis of rotation of said end fitting.

13. The end fitting and cross assembly defined in claim 11 wherein said span control sleeve includes an outwardly extending flange portion.

14. The end fitting and cross assembly defined in claim 13 wherein said outwardly extending flange portion is located a precise distance from said axis of rotation of said cross, and wherein said outwardly extending flange portion of said span control sleeve engages said surface on said arm portion to align said axis of rotation of said cross with said axis of rotation of said end fitting.

15. The end fitting and cross assembly defined in claim 13 wherein said outwardly extending flange portion has a generally C-shaped configuration.

16. The end fitting and cross assembly defined in claim 13 wherein said outwardly extending flange portion has a pair of notches formed therethrough that define a tab.

17. The end fitting and cross assembly defined in claim 16 wherein said tab has an opening formed therethrough.

18. The end fitting and cross assembly defined in claim 11 wherein a span control sleeve is supported on each of said bearing cups, each of said span control sleeves includes an outwardly extending flange portion, and a retainer strap extends between said span control sleeves.

19. The end fitting and cross assembly defined in claim 18 wherein each of said outwardly extending flange portions has a generally C-shaped configuration.

20. The end fitting and cross assembly defined in claim 18 wherein each of said outwardly extending flange portions has a pair of notches formed therethrough that define a tab.

21. The end fitting and cross assembly defined in claim 20 wherein each of said tabs has an opening formed therethrough, and wherein said retainer strap extends through said openings.

22. The end fitting and cross assembly defined in claim 11 wherein said span control sleeve includes an inwardly extending flange portion that engages a closed end portion of said bearing cup.

* * * * *